G. H. SCHKOMMODAU.
ELECTRIC WELDING APPARATUS.
APPLICATION FILED OCT. 2, 1916.
1,248,927.
Patented Dec. 4, 1917.
10 SHEETS—SHEET 1.
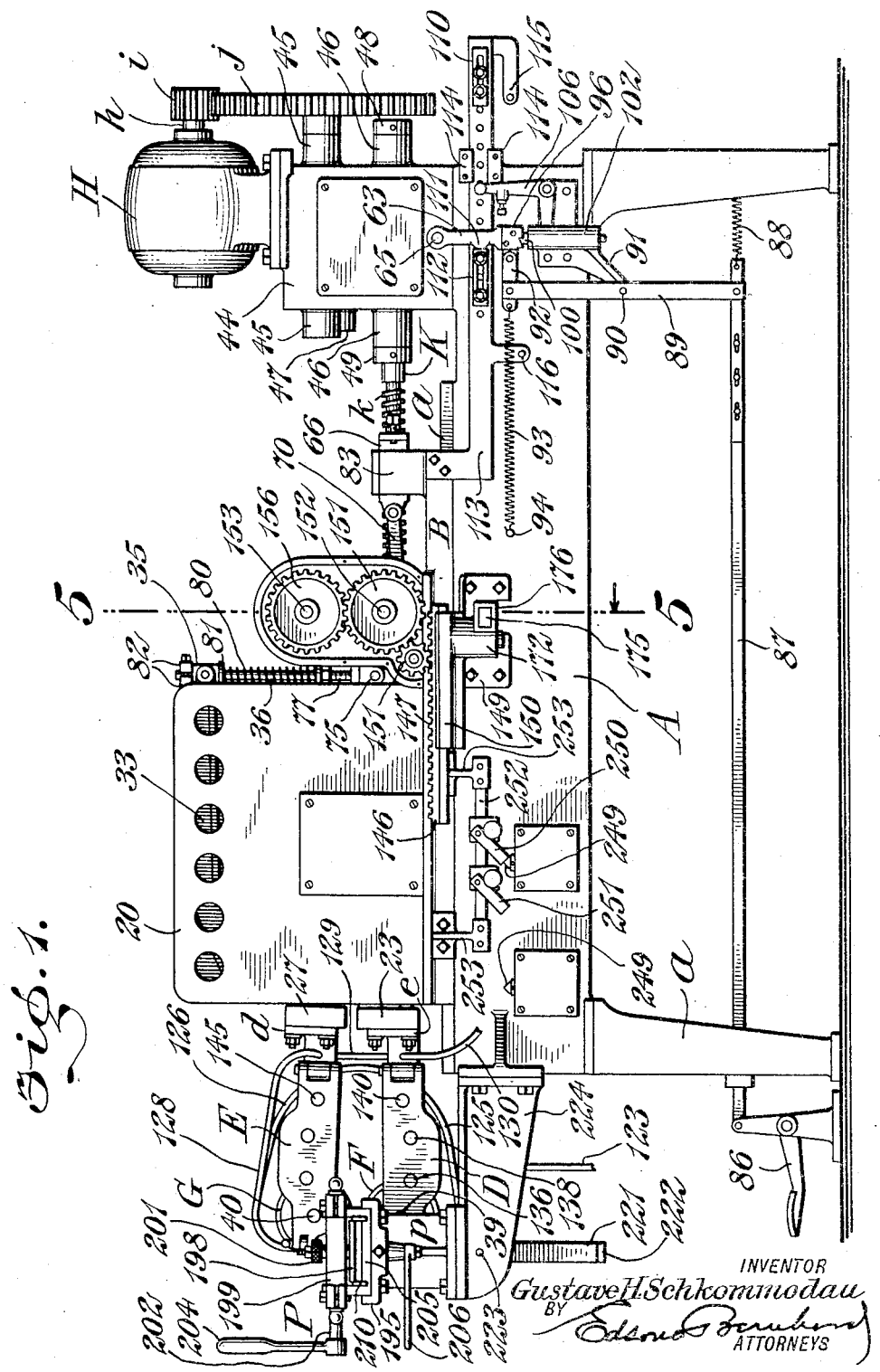
INVENTOR
Gustave H. Schkommodau
BY
Edson
ATTORNEYS

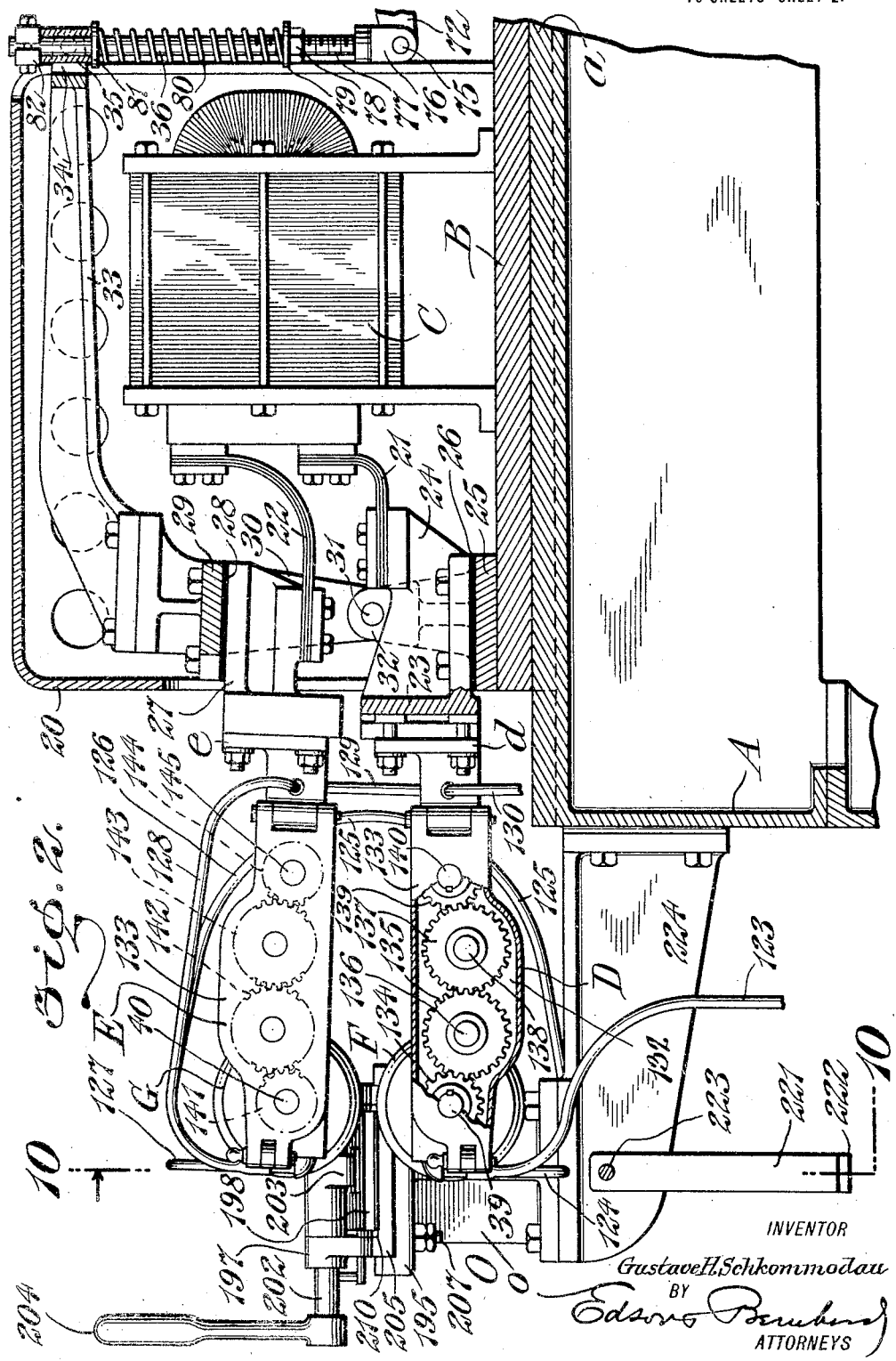

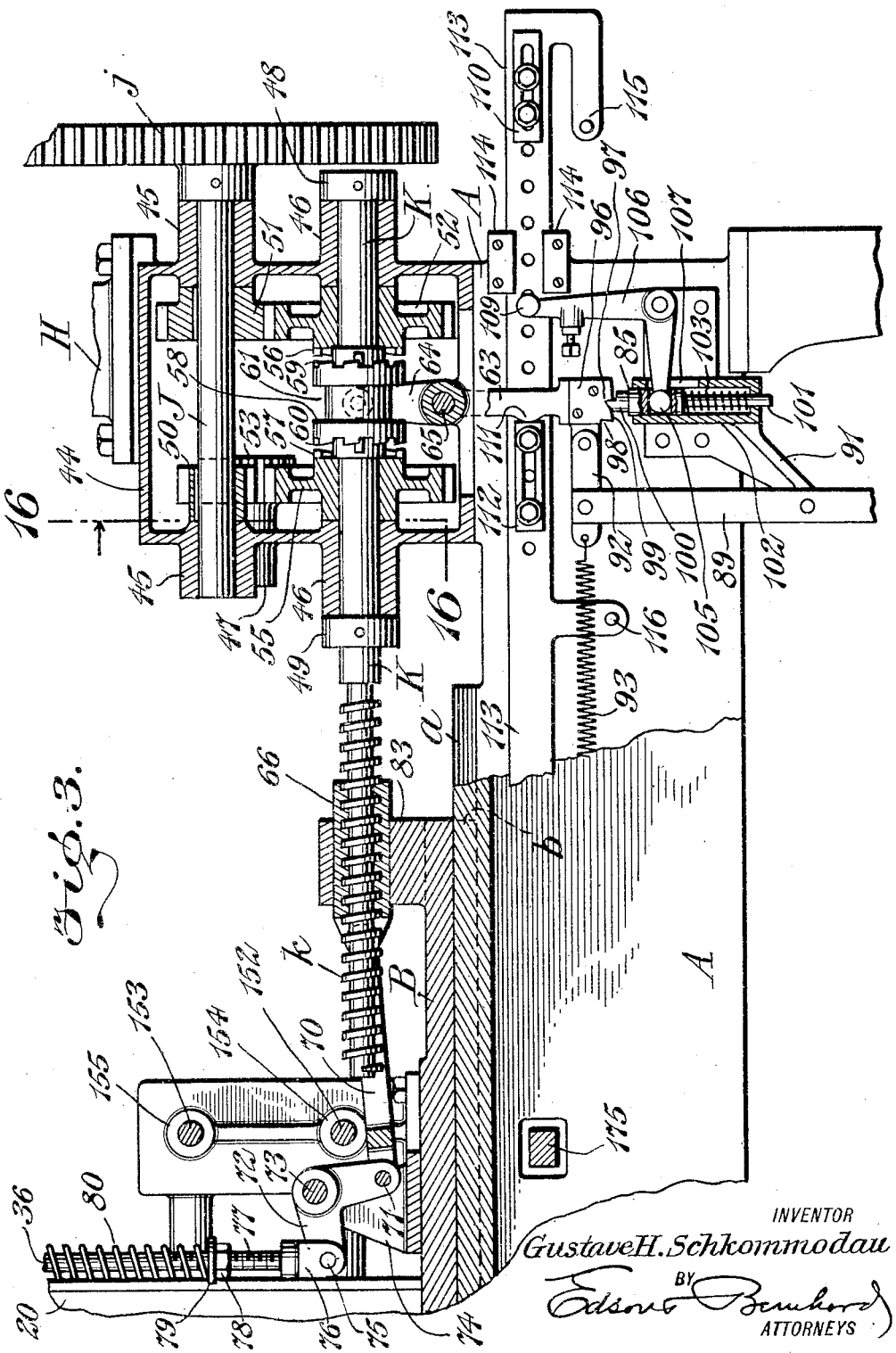

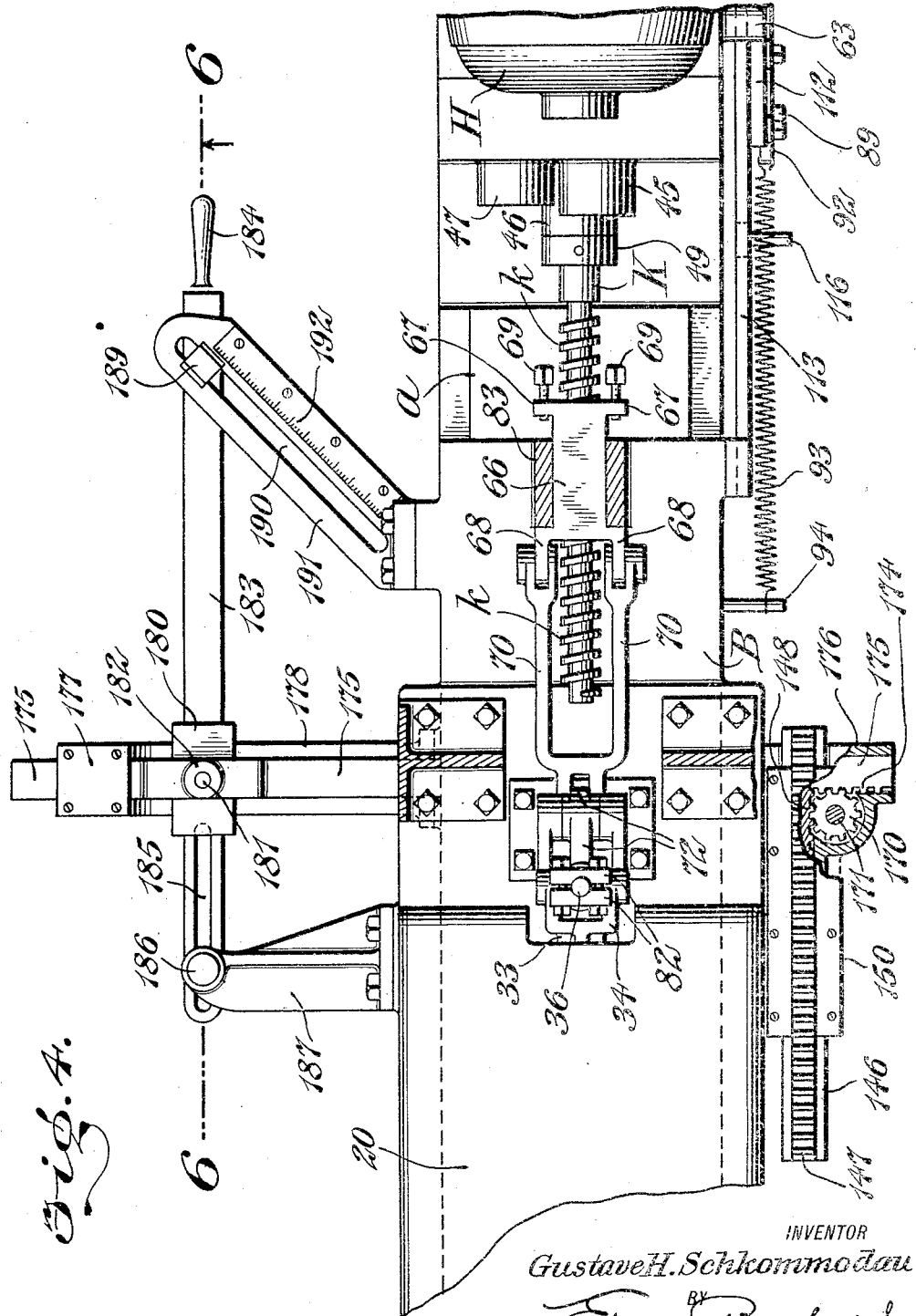

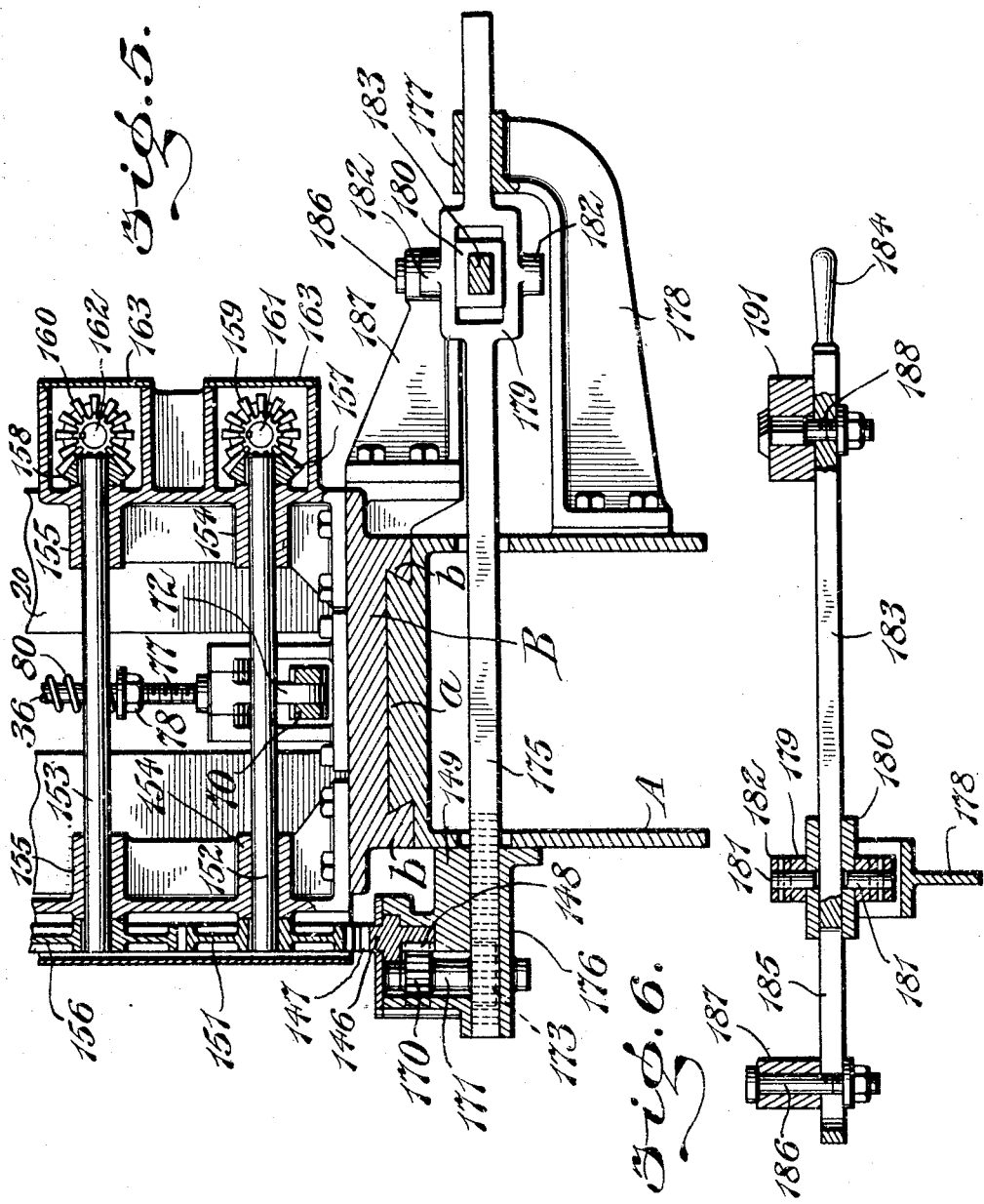

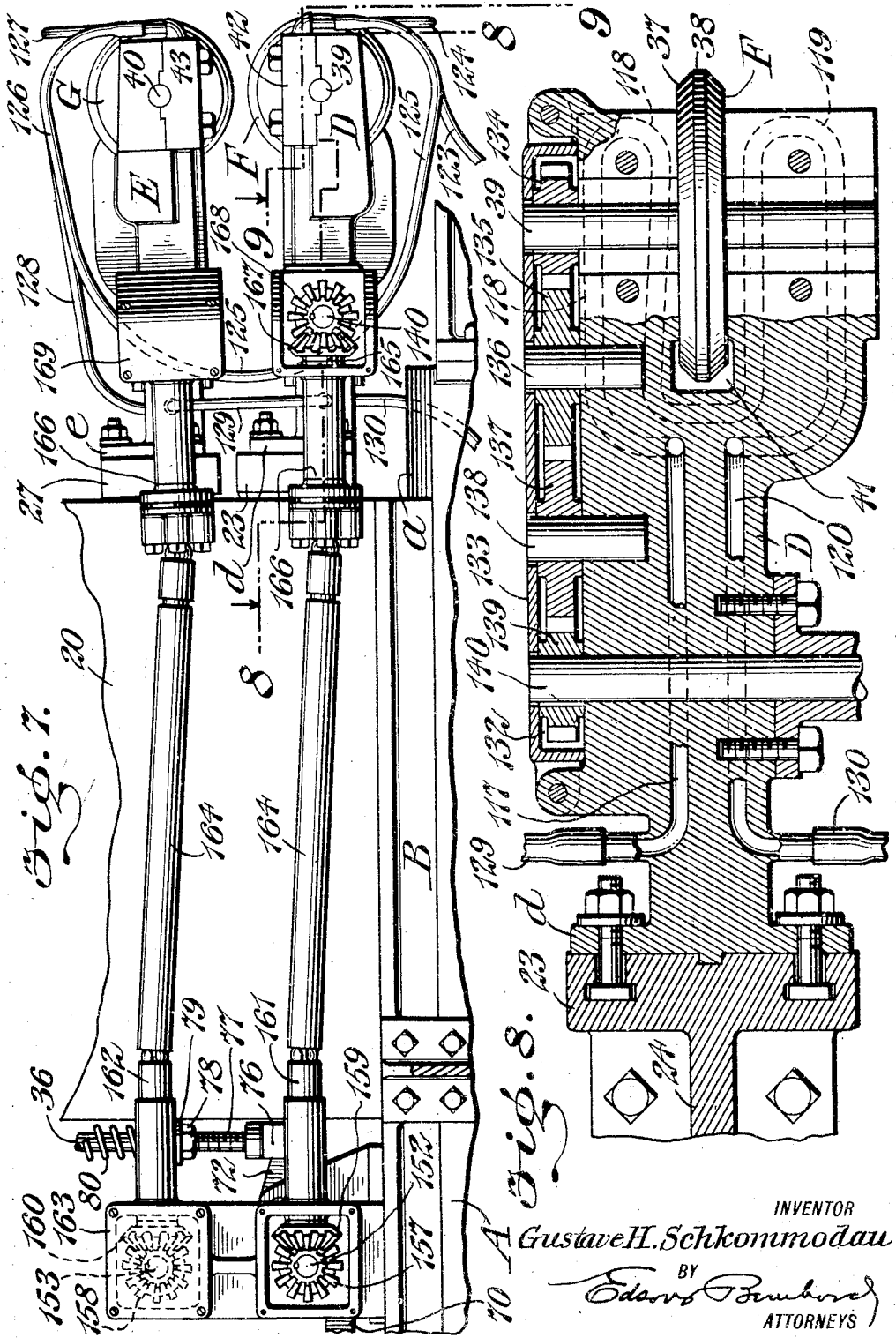

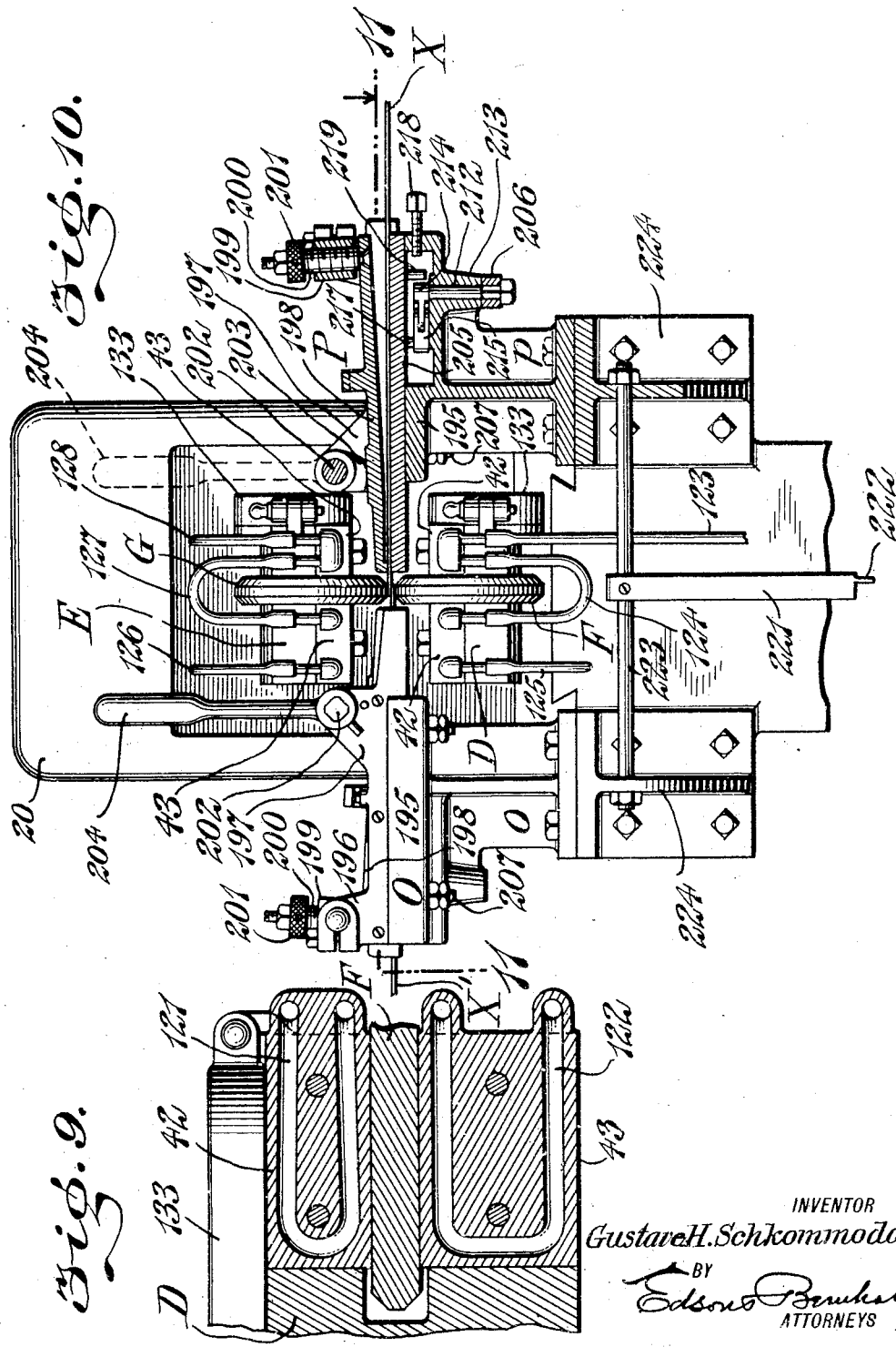

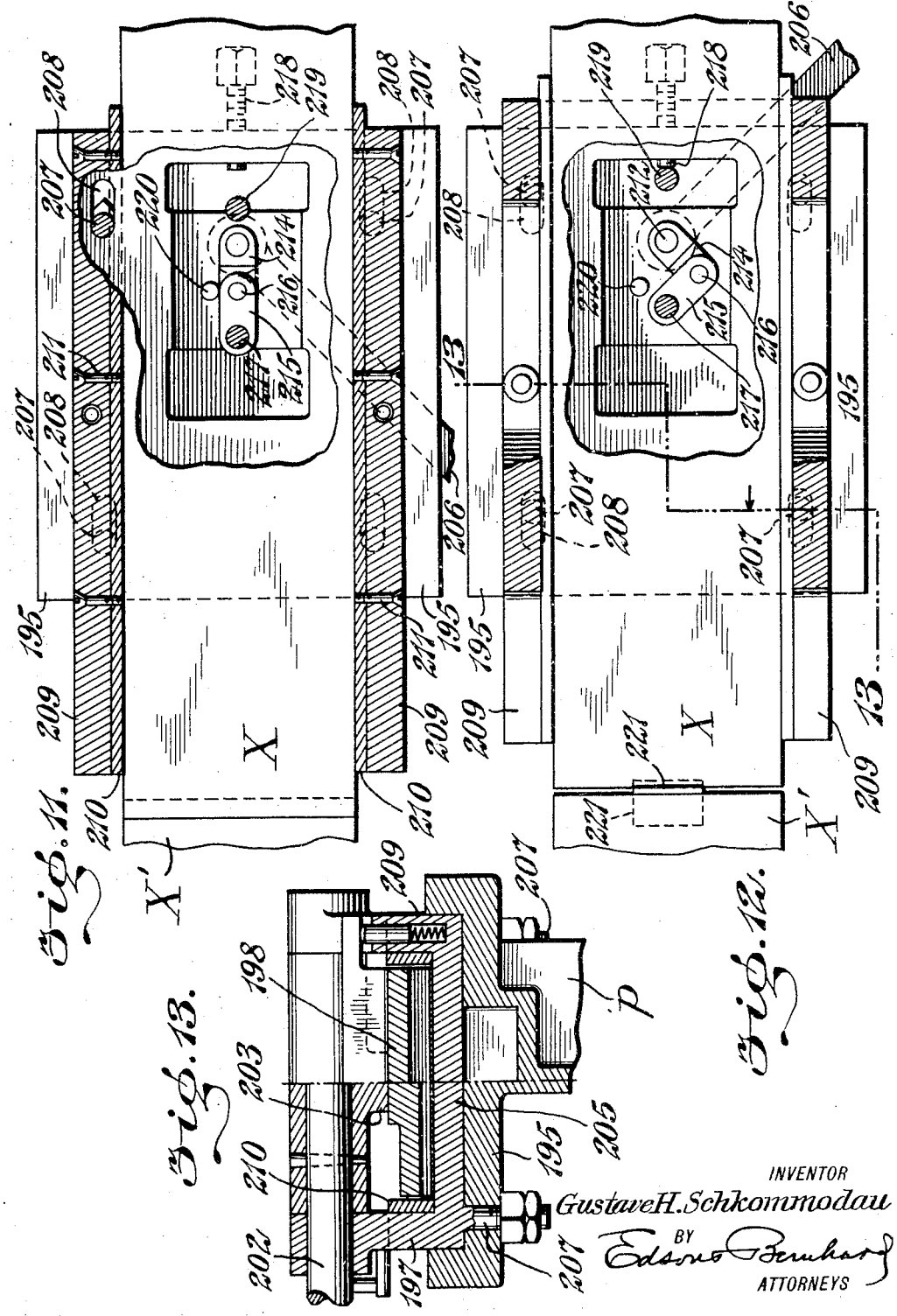

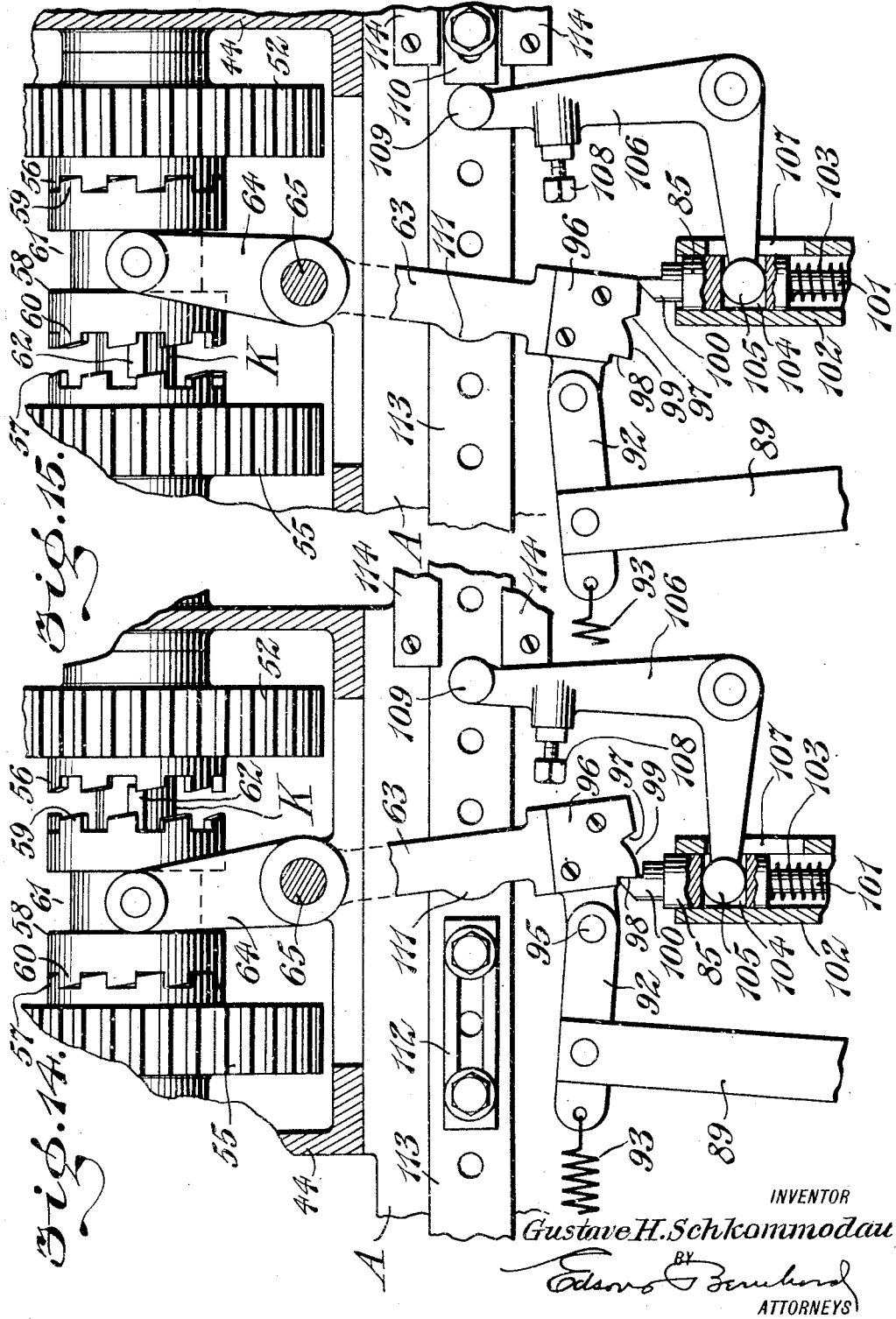

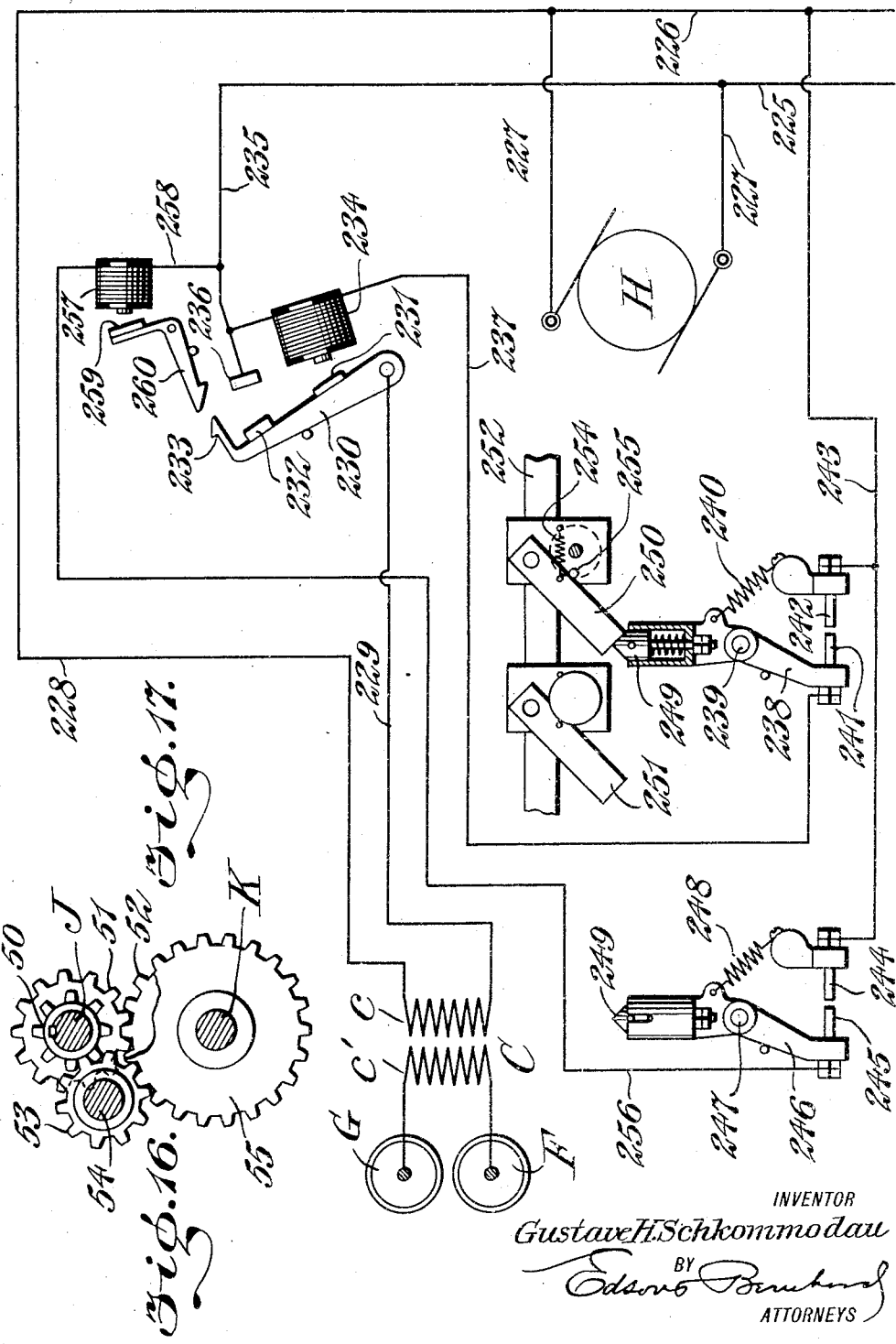

UNITED STATES PATENT OFFICE.

GUSTAVE H. SCHKOMMODAU, OF CINCINNATI, OHIO, ASSIGNOR TO CARY MANUFACTURING CO., OF BROOKLYN, NEW YORK, A CORPORATION OF NEW YORK.

ELECTRIC WELDING APPARATUS.

1,248,927. Specification of Letters Patent. Patented Dec. 4, 1917.

Application filed October 2, 1916. Serial No. 123,269.

*To all whom it may concern:*

Be it known that I, GUSTAVE H. SCHKOMMODAU, a citizen of the United States, residing at Cincinnati, county of Hamilton, and State of Ohio, have invented a certain new and useful Electric Welding Apparatus, of which the following is a specification.

This invention is an electric welding apparatus, the same being adapted, more particularly, for welding metal in sheet form, although it is apparent that by modification the apparatus may be employed for effecting the union of metal pieces of other forms, such as rod or bars the cross sectional dimensions of which are relatively small.

The apparatus of this invention is characterized, chiefly, by a plurality of current-carrying rolls for applying to the metal to be welded the pressure required to effect the weld and simultaneously therewith to electrically heat the metal, to the point of fusion, whereby at one operation the metal is fused and subjected to pressure along a definite line.

An apparatus embodying the invention comprises a plurality of work-holding clamps of one form or another wherein the two pieces are respectively held in fixed relation to each other and in a definite relation to the path of the rolls for supplying the current and pressure, a reciprocating table movable relatively to said work-holding clamps, a plurality of roll-carrying heads one of which is fixed to the table and the other is mounted pivotally on said table for movement relatively to the fixedly attached head and both of said heads being movable with the table during the traverse thereof, rolls journaled in the heads, power-operated mechanism for imparting reciprocating movement to said table in order that the rolls may traverse the metal in the direction of the weld so as to apply electric heat and pressure simultaneously to the metal, and means operable upon the reciprocating movement of the table for closing the rolls upon the metal when said rolls move in one direction, said means being effective in separating said rolls in a reverse direction in order that said rolls upon their return to normal position may be free from contact with the welded metal.

The invention embodies, also, means for imparting rotative movement positively to said rolls during the traversing movement thereof.

The invention consists, further, in the provision of manually controllable means for effecting a variation in the peripheral speed of the welding rolls.

The invention consists, further, in the provision of means for cooling the heads which carry the current-conducting rolls by circulating a cooling medium within the heads whereby excessive heating of the rolls and the heads occasioned by the flow of the heavy welding current therethrough is avoided.

The invention consists, also, in an automatic reversible driving mechanism operating to return the table and its contained parts back to normal positions.

The invention consists, further, in the provision of means operating upon the initial movement of the table and the closing of the normally-separated rolls upon the metal to establish the flow of the welding current through a transformer, said means being effective in cutting out the transformer at the beginning of the return movement of said table and the rolls.

The invention further consists in the novel combination and construction of parts hereinafter set forth and defined in the claims.

Other functions and advantages of the invention will appear in the course of the detailed description taken in connection with the drawings, wherein Figure 1 is a side elevation of an electric welding apparatus embodying this invention, a portion of the gear housing being omitted and the several parts of the machine being shown in their neutral positions.

Fig. 2 is a view on an enlarged scale showing a portion of the reciprocating table, the roll-carrying heads, the rolls, the transformer and one of the work-holding clamps, said view being partly in vertical section and partly in side elevation.

Fig. 3 is an enlarged vertical sectional view through the mechanism for imparting the reciprocating movement to the table and its contained parts, said view illustrating the reversible driving mechanism in a neutral position.

Fig. 4 is a sectional plan view of the mechanism illustrated in Fig. 3, parts being broken away in order to show certain details.

Fig. 5 is a vertical transverse section through the machine taken in the plane indicated by the line 5—5 of Fig. 1 looking in the direction of the arrow, and showing more particularly the means for positively rotating the rolls and a part of the mechanism by which the peripheral speed of the rolls may be varied as desired.

Fig. 6 is a detailed section on the line 6—6 of Fig. 4 illustrating the regulator bar by the adjustment of which the peripheral speed of the rolls may be varied as desired within certain limits.

Fig. 7 is an elevation looking toward one side of the reciprocating table and the roll-supporting heads, certain parts being removed in order to show the gearing employed for imparting positive rotation to the rolls.

Fig. 8 is an enlarged detail horizontal section through the supporting head for the lower roll, taken in the plane indicated by the dotted line 8—8 of Fig. 7, and showing more particularly the construction whereby a cooling medium is adapted to be circulated within the interior of said roll-supporting head.

Fig. 9 is a horizontal section on the line 9—9 of Fig. 7 through one of the shaft bearing caps illustrating the means for the circulation of the cooling medium interiorly within said cap.

Fig. 10 is a front elevation partly in vertical section of the machine, the plane of the section being indicated by the dotted line 10—10 of Fig. 2, looking in the direction of the arrow.

Fig. 11 is a horizontal section in the plane of the dotted line 11—11 of Fig. 10 illustrating one of the work holding clamps adjusted to bring the material, held within said clamp, into lapping relation to another piece of material, which two pieces of material are to be electrically welded.

Fig. 12 is a view similar to Fig. 11 of one material-holding clamp in the position assumed by said clamp prior to its movement to bring the material therein into overlapping relation to another piece of material.

Fig. 13 is a vertical cross section in the plane of the dotted line 13—13 of Fig. 12.

Figs. 14 and 15 are enlarged views in side elevation, partly in section, illustrating the reversible driving mechanism in the positions required to impart the forward movement to the table and the rolls and to return the table and the rolls to normal positions.

Fig. 16 is a detail section on the line 16—16 of Fig. 3 through a train of gears adapted to impart the forward and the return movements at different speeds to the reciprocating table.

Fig. 17 is a diagram through the electric circuits.

A designates a horizontal bed of the required length and width, supported at a suitable elevation by legs. The top surface of said horizontal bed A is provided with a guideway $a$, dovetailed in cross section as shown in Fig. 5. Fitted to this guideway is a reciprocating table B, the side edges of which are provided with flanges $b$ which slidably embrace the guideway $a$, as in Fig. 5, in order to operatively connect the sliding table B to the guideway and to permit said table to have reciprocating movement in a rectilinear path. The table B carries a housing 20 for a transformer C, see Fig. 2, and upon the forward part of the table are supported heads D E, in which heads are mounted the shafts of welding rolls F G, whereby the transformer, the roll-supporting heads, and the welding rolls are adapted for reciprocating movement with the table B.

The transformer C is of any usual or preferred construction, the primary and secondary windings of which are connected by flexible conductors 21, 22 with the roll-supporting heads D E, whereby the welding current is adapted to flow through the heads D E and the rolls F G.

The head D for the lower roll is a chambered casting of the form shown more particularly in Figs. 1, 2 and 8, said casting being provided at one end with a plate $d$ fitted against a vertical plate 23 on a bracket 24 positioned within the housing 20, said bracket being bolted firmly to a base-plate 25 secured solidly to the reciprocating table B, and said bracket 24 being insulated electrically at 26 from the bed plate 25, whereby the lower head D is attached solidly to the forward part of table B so as to project forward beyond the housing 20.

The other head E for supporting the upper roll is a solid casting similar to the head D shown in Fig. 8, but this upper head is mounted for pivotal movement with respect to the lower head so that the two rolls F G are adapted to be closed upon the metal to be welded and to be separated subsequent to the welding operation. Obviously, any desired construction may be employed for mounting the head E for pivotal movement relatively to the head D, but as shown the casting of the head E is provided with the face-plate $e$ bolted to a supporting member 27, the latter insulated electrically at 28 from a supporting yoke, the cross bar 29 of which is provided with depending lugs 30, which are pivoted by a stud or arbor 31 to short upstanding posts 32 of the bed plate 25, all as shown more particularly in Fig. 2, whereby the head E is adapted for pivotal movement on the axis afforded by the arbor 31. The pivoted head E is provided with an arm 33 extending rearwardly through the housing 20, the arm being positioned above the transformer C. The rear part of the arm 33 is forked at 34, see Fig. 4, to receive and carry a guide-box 35, through which passes the upper portion of a sliding rod 36, the latter being associated with power-operated means hereinafter described for effecting the pivotal movement of the head E as required in the operation of the machine.

Rolls F G are composed of suitable current conducting metal, preferably copper, although any other material may be employed. It is preferred to bevel each roll as indicated at 37 in Fig. 8, thus producing a relatively-narrow annular tread surface 38, the width of which is at least equal to the transverse dimensions of the weld for effecting the union of the two pieces of metal. Said rolls F G are positioned one above the other, and they are carried by shafts 39, 40 respectively, mounted in bearings at the forward unsupported ends of the heads D E, respectively, see Fig. 2. As shown more particularly in Fig. 8, the forward free part of each head D E is slotted vertically at 41, the width of the slot being slightly in excess of the width of the welding roll adapted to be positioned within the slot, so that the side faces of the roll will contact with the walls of the slot, whereby the roll is laterally supported within the slotted head. Said vertically slotted part of each head is formed with divided shaft bearings, one part of each shaft bearing being integral with the head, whereas the other part of the shaft bearing is fastened detachably to the head. In the case of the bearing for the shaft of the lower roll F, the head D has the lower half of the bearing integral therewith, whereas the upper removable half 42 of the bearing is bolted to the head. On the contrary, the shaft bearing for the upper roll G comprises an upper half which is integral with the head E, and the lower half 43 of said bearing is bolted detachably to said head E, whereby the halves 42, 43 of the bearings for the lower and upper rolls F G are removable at will from the heads, D E, and said removable halves 42, 43 of the bearings are adapted to be constructed as in Fig. 9, to provide for the circulation of a cooling agent through the bearings directly adjacent to the current-carrying rolls as will hereinafter appear.

It is apparent from the drawings that the reciprocating table carries a heavy load owing to the weight of the transformer, the heads D E, the rolls F G, and the several parts associated therewith. The weight of the parts makes it necessary to employ power-operated means for imparting the reciprocating motion to the table and its contained parts, and in the present invention a motor of one form or another is employed for driving a reversible mechanism which imparts the required movement automatically to said reciprocating table. In Fig. 1 of the drawings, the driving motor is illustrated as an electric motor H, the shaft $h$ of which is provided with a pinion $i$ adapted to drive a gear $j$ on a shaft J constituting one element of a reversible driving mechanism. The electric motor H is mounted upon a gear housing 44 rigidly attached to a part of the bed A at a suitable distance in the rear of the reciprocating table B. This gear housing is provided with shaft bearings 45, 46, 47, the shaft J being journaled in the bearings 45.

K designates a shaft journaled in bearings 46 of the gear housing 44, said shaft being below the shaft J and parallel thereto, as in Fig. 3. Said shaft K is provided with collars 48, 49, which coöperate with the bearings 46 to preclude endwise movement of the shaft in the bearings.

Secured rigidly to the shaft J are gear pinion 50 and a gear 51, the latter meshing directly with a gear 52 mounted loosely on the shaft K, see Figs. 3 and 16, whereas the gear pinion 50 meshes with an intermediate gear 53, mounted on a stub shaft 54 supported by the bearing 47, said intermediate gear 53 meshing with a gear 55 mounted loosely on shaft K, whereby shaft J is adapted through either set of gears described to impart rotative movement in one direction or the other to the shaft K; that is to say, shaft J is adapted through the gears 51, 52 to impart rotative movement in one direction to shaft K and at a predetermined speed, whereas said shaft J is adapted through the gears 50, 53 and 55 to impart rotative movement in an opposite direction and at a slower speed to shaft K. The gears 52, 55 mounted loosely on shaft K are in opposing relation to each other, and they are provided with clutch faces 56, 57, respectively, see Figs. 3, 14 and 15. Positioned between the gears is a double clutch 58 having clutch faces 59, 60, at the respective end portions thereof and a groove 61 intermediate said clutch faces. The clutch is connected fast with the shaft K by a feather or spline 62 so that said clutch is capable of sliding movement on the shaft and will rotate therewith at all times; and with the grooved part 61 of this clutch engages a shipper lever 63, the upper part of said shipper lever being forked at 64 in order to straddle or embrace the grooved part 61 of the clutch, said shipper lever being fulcrumed intermediate its ends by a rock shaft 65 suitably mounted within the lower portion of the gear housing 44, see Figs. 3, 14 and 15. With the shipper lever 63 and the clutch 58 adjusted to the position of Fig. 14, the face 60 of the clutch is in engagement with the face 57 of the gear 55, whereby the gears 50, 53 and 55 will be driven by shaft J for rotating shaft K in one direction and at slow speed so as to move the table B and the rolls F G in a forward direction across the metal so as to effect the welding thereof. The shipper lever 63 is adapted to be turned by automatic mechanism hereinafter described to the position of Fig. 15 in order to disengage the clutch 58 from the gear 55 and to bring the face 59 of said clutch into engagement with the face 56 of the gear 52, whereby the shaft J is driven by the gears 51, 52 for the purpose of imparting rotative movement in an opposite direction and at faster speed to shaft K so as to effect the return movement of the table B and rolls F G at an increased speed compared to the forward movement of the table and said rolls.

As shown in Figs. 3 and 4, the shaft K is prolonged or extended a considerable distance beyond the roll housing 44, said extended part of the shaft being provided with an external or male thread $k$. Said threaded part of the shaft works in, and has threaded engagement with, the internal thread of a nut 66, shown more particularly in Fig. 4 as an elongated metallic casting which is of angular form in cross section, said nut being provided in addition to the internal thread with stop lugs 67 at its rear end and pivotal lugs 68 at its forward end. The stop lugs 67 support adjustable stop screws 69, and to the lugs 68 are pivoted the forks of a slotted link 70, said slotted link fitting loosely around the threaded part $k$ of the shaft K. The forward end of the slotted link 70 is pivoted by a bolt 71 to the depending arm of a bellcrank 72, the latter being fulcrumed at 73 on a supporting bracket 74 fixed to the sliding table B, see Figs. 3 and 4. The other arm of bellcrank 72 is connected by a pin 75 to the head 76 on the lower end of the vertically positioned rod 36 which is attached to the arm 33 of the pivoted head E adapted for supporting the upper welding roll G. This rod 76 is externally threaded for a part of its length, as at 77, on which threaded part is screwed a nut 78 supporting the washer 79 that serves as a seat for the lower end of a spring 80, the upper end of said spring being in contact with a washer 81 which is pressed by the spring against the sleeve 35 at the rear end of the arm 33 of pivoted head E. The upper part of the rod 36 is provided with a divided collar 82 which is adapted, when the rod 36 is pulled in a downward direction by the bellcrank 72, to rest upon the guide-sleeve 35 for the purpose of pulling downwardly upon the arm 33 and of raising the head E so as to withdraw the welding roll G from the metal to be welded and thus separate rolls F G as required upon the return movement of the reciprocating table and the rolls after the metal shall have been welded.

The nut 66 is not attached fixedly to the reciprocating table, but on the contrary, said nut is capable of a limited movement relatively to the table, but in other respects said nut is in fast relation to the table. As shown, the rear part of the table B is provided with an upstanding bearing 83 having an opening corresponding to the external dimensions of the nut, whereby said nut is fitted in the bearing 83 so as to be held thereby against rotative movement under the rotative action of threaded part of the shaft K, and at the same time said nut is capable of a limited sliding movement when acted upon by the threaded part of the shaft. Said sliding movement of the nut in a rearward direction is arrested by the pivotal lugs 68 on the front end of the nut coming into contact with the bearing 83, whereas the forward movement of the nut is limited by the stop screws 69 abutting the rear of the bearing 83, said forward movement being regulatable by adjusting the screws 69.

It will be understood that rotation of the shaft K by the train of gears 50, 53, 55 causes the threaded part $k$ of said shaft to operate upon the nut 66, for the purpose of imparting sliding movement in a forward direction to the table B and the parts thereof, but there is a limited lost motion between the table B and the nut 66, which lost motion is utilized for the operation of the devices employed to impart pivotal movement to the head E, thereby lowering the roll G into contact with the metal to be welded. With the parts in the normal position shown in Figs. 3 and 4, the screw-shaft K acts on the nut 66 to slide it within the bearing 83 until the stop-screws 69 abut said bearing 83 so as to limit the forward thrust of the nut 66 relatively to the table, and it is this initial sliding movement of the nut 66 which operates the link 70 and the bellcrank 72 so as to thrust the rod 36 in an upward direction and slide it through the sleeve 35, as a result of which the collar 82 is raised with respect to the sleeve, and the spring 80 is compressed between the sleeve and the nut 78 on said rod 36, whereby the arm 33 is thrust in an upward direction, and the head E and welding roll G are depressed under the pressure of the spring 80, the roll G being thus retained under yielding pressure in contact with the metal as the rolls F G traverse said metal upon the forward movement of the table. It will be understood, further, that said forward movement is imparted to the table by the action of the screw-shaft upon the nut which is in contact with the bearing 83, said nut being fed in a forward direction by a rotative movement by the screwshaft in one direction, and the nut shoving the table and its contained parts until the rolls shall have traversed the width of the metal to be welded.

When the screw-shaft K is rotated in an opposite direction by the gears 51, 52, the threaded part of said shaft first acts on the nut 66 to slide it within the bearing 83 until the pivotal ears 68 abut said bearing, the effect of which reverse rotation of the shaft K is as follows:—The limited sliding movement of the nut 66 draws on the link 70 and pulls bellcrank 72 so as to depress the vertical rod 36 and pull the stop collar 32 downward on the sleeve 35, thus imparting pivotal movement to the head E for the purpose of lifting the roll G free from contact with the metal. Immediately thereafter, the nut 66 is acted on by the screw-shaft so as to impart movement in a rearward direction to the table B, which table carries the welding rolls and associated parts back to the normal positions.

The double clutch 58 is retained in a neutral position intermediate the loose gears 52, 55 so that the faces of said clutch are free from engagement with the faces 56, 57 of said gears, the neutral position of the clutch being indicated in Fig. 3 and said clutch being locked against idle movement. The locking operation is due to the engagement of a latch 85 with the shipper lever 63, see Figs. 1, 3, 14 and 15. This latch and the shipper lever are controlled and operated by the following mechanisms:

The machine is started into operation by the attendant pressing on a treadle 86, to the upper end of which is pivoted a link 87, under the control of a spring 88 and to the forward end of which is connected the lower end of a lever 89, said lever being fulcrumed intermediate its ends by a pin 90 on a bracket 91 fixed to the horizontal bed A near the rear part thereof. Said lever 89 is pivoted at its upper end to a link 92, to the forward end of which is attached a spring 93, secured by a pin 94 to the side of the bed. The rear end of said link 92 is connected by a pin 95 to a lug of a cam-plate 96, the latter being secured to the shipper lever 63 at the lower part thereof, although it is evident that the cam may be formed integral with the shipper lever. Said cam-plate is fashioned in the lower edge thereof to produce shoulders 97, 98 joined by an intermediate curved edge 99, and with the shoulders 97, 98 is adapted to engage the nose 100 of the latch 85. Said latch is provided with a guide-stem 101 which is fitted for sliding movement in a spring housing 102, preferably formed as an integral part of the fixed bracket 91. A spring 103 is fitted loosely around the guide stem 101 of the latch, the lower end of the spring being seated within the spring housing 102, whereas the upper end of the spring presses against an enlarged body portion of said latch, and in this enlarged body portion is a slot 104 which receives the rounded end 105 on one arm of the bellcrank 106, said arm being free to work in a slot 107 of the spring housing 102. The bellcrank 106 is provided with a stop-screw 108 positioned in the path of the shipper lever 63, and to the rear thereof, the vertical part of this bellcrank being enlarged or rounded at 109, so as to lie in the path of an operating-plate 110 presently referred to. The shipper lever 63 is provided intermediate its ends with a swelled surface 111 which is in the path of another operating-plate 112, the two plates 110, 112 being attached to a sliding-member 113 which is movable with the reciprocating table B. As shown in Figs. 1 and 3, the sliding member 113 is in the form of a bar positioned close to one side of the bed A, the forward part of the bar 113 being bolted to the rear part of the sliding table B, and said sliding bar being supported and retained by guide-plates 114 attached to the bed at the rear thereof. The shipper lever 63 is positioned close to the sliding bar 113 so that the operating-plate 112 is adapted to contact with the swelled surface 111 of said shipper lever when the bar 113 moves rearwardly with the table B during the return movement of said table to normal position.

Before the machine is started into operation, and with the clutch 58 in the neutral position shown in Figs. 1 and 3, the latch 85 is projected by the spring against the curved surface 99 and has locking engagement with the shoulder 97 on the cam-plate 96 of said shipper lever, thus locking the shipper lever and the clutch. Now, when the operator presses upon the treadle 86, the lever 89 is operated to throw the upper end thereof rearwardly, this movement of the lever being opposed by the spring 93, and acts upon the link 92 to move the shipper lever 63 to the position of Fig. 14, the curved surface 99 of the cam-plate riding over the beveled nose of the latch 85 until said curved surface clears the latch, whereupon the spring 103 presses the latch upwardly so that the latch will have locking engagement with the shoulder 98 of the cam-plate, the parts being now in the position of Fig. 14. This movement of the shipper lever shifts the clutch 58 toward the left in Fig. 14 so that the face 60 of said clutch engages with the face 57 on the gear 55, and the shaft K is now rotated in one direction so as to operate upon the feed nut 66 in a manner to impart movement in a forward direction to the table and the welding rolls. The bar 113 travels forwardly with the table until the stop-plate 110 contacts with the enlarged part 109 on the bellcrank 106, whereupon the bellcrank is turned in a direction to depress the latch 85 against the tension of the spring 103, thereby withdrawing the latch from engagement with the cam-plate of the shipper lever, whereupon the spring 93 becomes effective in pulling the link 92 and the lever 89 in a forward direction, said spring acting primarily to reverse the shipper lever 63 and thus slide the clutch 58 along the shaft K for the purpose of disengaging said clutch from the gear 55 and engaging the clutch with the other gear 52 in a manner to make said gear 52 fast with the shaft K, during which swinging movement of the shipper lever 63 the cam-plate 96 moves over the latch without restraint therefrom, and the parts finally assuming the position shown in Fig. 15. The table B and its contained parts now travel in a rearward direction, the bar 113 sliding with the table and through the guides 114 until the stop-plate 112 on said bar 113 comes into contact with the swelled portion 111 of the shipper lever, whereupon the lever 63 is operated upon by the plate 112 so as to disengage the clutch 58 from the gear 52 and to turn the cam-plate 96 to a position for the nose of the latch to engage with the shoulder 97, said latch thus operating to lock the shipper lever in a neutral position, wherein the clutch is midway between the gears 52, 55, the table B and its contained parts being at rest.

The sliding bar 113 is provided in addition to the plates 110, 112 with emergency stops 115, 116 adapted to contact with the bellcrank 106 and with the lever 89 respectively, should said plates 110, 112, or either of them, work loose or become detached, whereby the emergency stops 115, 116 will act in one direction or the other to impart the required movement to the shipper lever in order to control the clutch and preclude the movement of the table B beyond the predetermined limits.

I will now proceed to describe the means employed for the circulation of a cooling medium through the roll-supporting heads D E and the removable halves 42, 43 of the bearing-boxes for the roll shafts, reference being had in this connection to Figs. 1, 2, 7, 8, 9 and 10 of the drawings.

Each head D E is provided with interior circulating passages, as shown in Fig. 8. The passage 117 extends longitudinally through the metal mass composing the head, the forward end of said passage being extended in the form of a loop 118 positioned adjacent one side of the roll mounted in the head, said looped part 118 extending rearwardly of the slot 41 in the head and being joined to another loop 119 positioned in the head on the other side of the roll-receiving slot 41. Said loop 119 is connected with another longitudinal passage 120, the latter being parallel to the first named passage 117. It will be understood that the passages 117, 120 are formed with loops 118, 119, the two loops being positioned at the respective sides of the roll-receiving slot 41, so that the cooling medium is adapted to have an extended circulation within the head, and particularly at points adjacent to the roll, the metal mass composing which roll is adapted to be heated to such a temperature as will result in fusion of the metal to be welded, said passages 117, 120 and their loops 118, 119 being indicated by full and dotted lines in Fig. 8.

The halves 42, 43 of the shaft bearings for the rolls in the heads are provided with circulating passages of the form shown in Fig. 9. It will be understood that each bearing cap 42, 43 is in two parts positioned at the respective sides of the roll, and, further, that one part of each bearing cap is provided with a looped circulating passage 121, whereas the other part of each bearing cap is provided with another looped circulating passage 122.

The liquid connections are as follows:—A flexible tube pipe or hose 123 leads from any suitable source of supply to one half of the bearing cap, 42 so as to communicate with the passage 121 see Figs. 9 and 10, thus permitting the liquid to circulate through the passage 121 in one part of the bearing cap 42. The liquid flows out of the passage 121 through a looped pipe 124, the respective end parts of which are attached to the two parts of the cap 42, and thus the liquid is supplied to the passage 122 so as to circulate through the other part of said bearing cap 42, whereupon the liquid flows out through the pipe 125, which pipe, as shown in Fig. 7, is doubled into a loop 126 extending rearwardly below the lower head E, and thence extending upwardly at the rear of the heads D and E, and thence extending forwardly to one part of the upper bearing cap 43, so that the looped pipe 126 will communicate with a looped passage 122 in one part of the upper bearing cap 43, from which part of the bearing cap 43 extends a looped pipe 127, which extends over the roll G and thence to the other part of the upper bearing cap 43 so as to communicate with the passage 121 therein, and from this last mentioned part of the upper bearing cap 43 extends a pipe 128, which pipe 128 extends rearwardly above and along the head E so that the pipe 128 will be connected, as shown in Fig. 2, with the rear part of the head E. Said pipe 128 communicates with the passage 117 in the upper head for the liquid to flow from the rear of the head E through the passage 117 into the loop 118 at the forward part of the head E, and thence into the loop 119, thence into the passage 120 all in the head E. The liquid flows from the passage 120 of the head E through a pipe 129 extending downwardly from the rear part of the head E, as shown in Fig. 2, which pipe 129 is connected to the rear part of the lower head D so that the pipe 129 will communicate with the passage 117 of said lower head D in a manner for the liquid to circulate through the passages 117 and 120 and the loops 118 and 119 thereof, all within the head D, and finally the liquid escapes from the passage 120 of the lower head through a pipe 130, which leads to any suitable place of discharge.

It is evident that any suitable cooling medium may be employed, such as water; that the cooling medium may be circulated by a pump or otherwise, and although I have described that the cooling medium is admitted by pipe 123 and exhausted by pipe 130, the direction of the circulation may be reversed.

The described construction of the heads D E and the cap boxes 42, 43, provide efficient means for dissipating the heat adapted to be absorbed by the metal composing the carriers for the welding rolls, and, further, that the several passages in the parts D, E, 42, 43 are so disposed as to efficiently cool the surfaces which are likely to be heated to the maximum, which circulation of the cooling medium is attained without in any way interfering with the functions and operations of the roll-carrying heads.

When welding rolls are pressed together and movement is imparted in a forward direction to said rolls in order to traverse the pieces of metal to be welded, said welding rolls are rotated positively during the period of said traversing movement, and I will now proceed to describe a preferred embodiment of means for effecting the positive rotation of said rolls at the period of said traversing movement.

As shown in Figs. 2 and 8, each head D and E is recessed in one side, at 132, for the accommodation of a train of gears associated with the shaft of the welding roll, said gear train being housed or incased by a plate 133 bolted to the roll-supporting means. The shaft 39 of roll F is provided with a gear 134 which meshes with a gear 135 on a stub-axle 136, which gear 135 meshes with another gear 137 on a stub-axle 138, and this gear 137 in turn meshes with a gear 139 on a shaft 140, extending through a suitable bearing provided in the rear part of the head D. The upper head E carries a gear train 141, 142, 143 and 144 indicated by dotted-lines in Fig. 2, one gear 141 being attached to the shaft 140 of the upper welding roll G, whereas the other gear 144 is fixed to a shaft 145, similar to the shaft 140 which drives the train of gears in the lower head D, whereby the two rolls F G are adapted to be positively rotated by the gear trains mounted in the respective heads.

The gear trains and the rolls are dependent for their rotation upon the traversing movement of the table B, so that the rolls are at rest when the table is not in motion. The means for effecting the rotation of the rolls, when the table is reciprocated, are as follows:—

146 designates a double rack positioned horizontally at one side of the bed A intermediate the ends thereof. Said rack is a bar of metal provided on its top edge with a series of teeth 147 and in its outer side face with another series of teeth 148, see Figs. 1, 4 and 5. The double toothed rack bar 146 is supported by a bracket 149, attached fixedly to the table A for retaining said rack bar in a position parallel to the table B and adjacent to one side thereof. Under certain conditions, this rack bar 146 occupies a stationary relation to the table when the latter is moving, but under other conditions, the rack bar is moved simultaneously with the table as will hereinafter appear. For supporting the rack bar 146 in slidable relation to the reciprocating table, I employ a guide 150 attached with the bracket 149 to the bed A. A gear 151 is positioned over the bar to mesh with the teeth 147 provided in the top edge of said rack bar.

At the rear part thereof, the housing 20 is provided with bearings 154, 155, in which are mounted two horizontal shafts 152, 153, said shafts being positioned one above the other, as shown in Fig. 5, and extending crosswise of the roll housing 20, at its rear portion, whereby the shafts 152, 153 are mounted in the roll housing for movement with the reciprocating table. The gear 151 meshes with the rack 146 and is attached to an end portion of the cross-shaft 152, and said gear 151 meshes with a gear 156 attached to the corresponding end portion of the upper cross-shaft 153, whereby with the rack bar 146 in a stationary position and with the table B moving in a rectilinear path, the gear 151 is rotated by traveling over the rack 146, and said gear 151 coöperates with the gear 156 in imparting rotative movement simultaneously to the shafts 152, 153 during such reciprocating movement of the table. Said shafts 152, 153 are provided at the other ends from the gears 151, 156, with beveled gears 157, 158, respectively, see Fig. 5, said beveled gears meshing with other beveled gears 159, 160, respectively on the stub shafts 161, 162. These stub shafts are partially incased within, and find bearings in, gear casings 163, of the housing 20, said stub shafts 161, 162, extending lengthwise of the housing on one side thereof as in Fig. 7. The stub shafts are connected by universal joints with a plurality of countershafts 164, the latter being connected by other universal joints with other stub shafts 165 journaled in bearings 166 at the forward end of the housing 20, said stub shafts 165 being provided at their forward ends with beveled gears 167, which beveled gears are in mesh with other gears 168 provided on the shafts 140, 145, respectively, said beveled gears 167, 168 being housed within gear boxes 169, see Fig. 7.

From the foregoing description, it will be understood that as the table B slides in a forward direction, the gear 151 in mesh with the rack 146 operates to turn the shafts 152, 153 so that these shafts impart rotative movement through the universally jointed shafts 164, to the shafts 140, 145 mounted in the roll-supporting heads D E, whereby the trains of gears will impart positive rotative movement to welding rolls F G as said rolls are pressed into contact with the metal and the traversing movement is imparted to said rolls by the forward motion of the reciprocating table. On the backward movement of the reciprocating table, the rolls are positively rotated because the gear 151 is in mesh with the rack 146, but at this time the head E is lifted relatively to the head D and the roll G is moved away from the roll F and the metal, hence on the return movement of the table the rolls F G are idle.

The peripheral speed of the welding rolls is dependent upon the proportions of the gears to the speed of the traversing movement imparted to the table, but it is desirable to provide means whereby the peripheral speed of said welding rolls may be varied, which speed variation is determined by the adjustment of a certain regulating mechanism as will now be described. Said regulating mechanism operates during the reciprocating movement of the table to impart a traveling movement to the rack bar 146, whereby the rack bar is moved longitudinally at the same time the table moves in a forward direction, and, further, said rack bar is operated positively to travel in an opposite direction to the direction of movement of the table; thus, when the table moves forwardly, the rack bar is moved rearwardly at the same time, which movement of the rack bar with respect to the gear 151 results in an accelerated speed of said gear 151.

Meshing with the rack teeth 148 on a vertical face of the rack bar 146, is a gear pinion 170, attached to the upper portion of a short vertical shaft 171, the latter being supported in suitable bearings of a housing 172, forming a part of the fixed bracket 149, see Figs. 4 and 5. Said vertical shaft 171 is provided near its lower portion with a gear 173, indicated in dotted lines in Fig. 5, which gear 173 is in mesh with the teeth 174 provided in a rack bar 175, the latter extending crosswise of the bed A and below the reciprocating table B. The transverse rack bar 175 is guided at one end portion by a guide-box 176 positioned below the guide 149 for the rack 146, whereas the other end of the transverse rack bar 175 is supported in a boxing 177 provided at the outer end of a bracket arm 178 which is bolted to the opposite side of the bed A from the longitudinal moving rack bar 146, see Fig. 5. Intermediate the end portions of the transverse rack 175, the latter is formed with a yoke 179, in the slot of which is positioned a pivotal box 180, the latter being provided with vertical trunnions 181 which are supported in bearings 182 provided in the upper and lower members of the yoke 179 of said transverse rack 175, whereby the rack 175 is guided for movement in a definite path transversely of the path of the rack 146, and the pivotal box 180 is free to turn in a horizontal plane within the rack bar 175 on the vertical box afforded by the trunnions 181. Through this pivotal axis 180 extends a regulator bar 183 which passes freely through said pivotal box. The regulator bar is positioned alongside the bed A, on the opposite side thereof from the rack bar 146, and one end portion of this regulator bar is provided with a handle 184, whereas the other end portion of the said bar is provided with a longitudinal slot 185 through which passes a bolt 186 on a bracket 187 fastened to one side of the reciprocating table B intermediate the ends thereof and extending outwardly therefrom. Near the handle of the regulator bar 183 is attached a bolt 188, which bolt is fitted slidably in a slot 190 provided in a graduated bar 191, the graduations on which are adjacent the slot as indicated at 192 in Fig. 4. Said bar is bolted firmly to the reciprocating table B so as to extend outwardly therefrom, and at a definite angle thereto, whereby the graduated bar occupies a fixed inclined relation to the reciprocating table.

With the regulator bar 183 adjusted as in Fig. 4 to a position parallel to the path of movement of the table B, the regulator bar together with the bracket 187 and the graduated bar 191, travels back and forth with table B in a manner for the bar 183 to slide freely through the guide boxing 180, as a result of which the reciprocating movement of the regulator bar does not impart any movement to the transverse rack 175. It is apparent that the nut on the bolt 188 may be loosened for the bolt to slide in the slot 190 of the graduated bar, the pivotal box 180 permitting the regulator bar to be turned to any desired inclined position with respect to the path of the reciprocating table. Said bolt 188 is adapted to be shifted to different positions in the slot 190, which positions will be indicated by the head 189 of the bolt being in register with the graduations 192 of the fixed bar 191. The bar 183 is thus adapted to be adjusted to different inclined positions relatively to the path of movement of the table B, said bar 183 being retained in said inclined adjusted positions by the graduated bar, the bracket 187, and the bolts 186, 188. The bar having been adjusted to a predetermined angle, said bar travels with the table in its back and forth movements. As the table moves in a forward direction to advance the rolls into contact with the metal, the transverse rack 175 is moved by the travel of the inclined regulator bar 183 acting upon the boxing 180 to impart movement to said rack bar 175, and thus the rack bar 175 is actuated by the mechanism described so as to turn the gear 173, the shaft 171 and the gear 170, as a result of which the rack 146 is moved in an opposite direction to the movement of the table B and simultaneously therewith. Now, as the gear 151 travels with the table, and the rack 146 is moved in an opposite direction to the table, it follows that the welding rolls will be positively rotated, and at an accelerated speed, due to the combined action of the moving table and of the moving rack 146 upon the gear 151. The angle of inclination of the regulator bar 183 determines the extent of movement of the transverse rack 175 and of the longitudinal rack 146, but by adjusting the regulator bar to different angles of inclination, the peripheral speed of the welding rolls may be governed and controlled as desired.

The two pieces of material to be welded are indicated at X X' in Figs. 10, 11, 12 and 13 of the drawings, and in a preferred embodiment of the invention, two independent work-holding clamps are employed, one of said clamps being indicated generally by the reference character O and the other P. The clamp O is supported in a fixed or immovable relation to the bed A of the machine by a bracket o, the latter being secured to an end portion of bed A and supporting the clamp O in a predetermined relation to the path of the welding rolls. The other clamp P is supported by a bracket p attached to the bed A, but this clamp P, or certain parts thereof, are movable for a definite distance with respect to the clamp O, in order that the material X adapted to be held in clamp P may be positioned into lapping relation to the material X' held in clamp O, whereby the marginal portions of the two pieces of material X X' may be welded for a definite width prior to the movement of welding rolls F, G to effect the union of said pieces by the welding operation.

In a general way, the clamps O and P are similar in construction and operation, except in the case of the clamp P the material-engaging devices are movable to bring the material of one clamp into lapping relation to the other clamp. Thus, each clamp comprises a base-plate 195 attached to or integral with the bracket o or p. This base-plate is channeled lengthwise to receive the material, and said clamp is provided with lugs 196, 197 extending above the base-plate. Within the base-plate operates a clamp member 198 which is in the form of a long flat plate, one end portion of which is pivotally supported in lugs 196 by the following devices: A pivotal bar 199 is provided at its end portions with trunnions which are received in suitable bearings of the lugs 196, and through this pivotal bar extends an adjusting bolt 200, the lower part of which is attached to the clamping plate 198 and the upper part of which is provided with a regulating thumb nut 201, whereby the pivoted end of the clamping-plate may be raised or lowered to regulate the pressure upon the material. The rock shaft 202 is mounted in the lugs 197 at a point over the moving clamp-plate 198, said rock shaft having a cam 203 and an operating lever 204, said lever being movable in a direction to force the cam into contact with the plate 198 for the purpose of moving said plate into forcible contact with the material.

In the case of the stationary clamp O, the movable plate 198 and the cam shaft 204 are mounted on the stationary bed plate 195, or are on the lugs 196, 197 of said base-plate; but with the other movable clamp P, the plate 198, its supporting means and the cam shaft are supported by a sliding member 205 positioned within the base-plate 195 and are adapted to be shifted longitudinally therein by the movement of a lever 206, see Figs. 11 to 13, inclusive. The sliding plate 205 is provided with bolts 207 which are adapted to move in slots 208 provided in the bed plate 195 in order to direct and limit the movement of the sliding plate. This sliding plate is provided on the side edges with flanges 209 which give a channeled cross section to said plate, and within the sliding plate are positioned side liners 210 which are held in position by screws 211 see Fig. 11. The sliding channeled plate 205 carries the means for supporting the pivotal bar 199 and the cam shaft 202 so that the plate 199 and its operating devices are movable bodily with the sliding plate 205 as it is adjusted back and forth by the lever 206. Said lever is fastened to the lower end of a short vertical shaft 212 which works in a hanger 213 integral with the bed plate 195 and depending therefrom, see Fig. 10. To the upper end of this vertical shaft 212 is fastened one member 214 of a toggle link, the other member of which toggle link 215 is pivoted by a pin 216 to said link 214, the free end of said toggle link 215 being connected by a pin 217 to the sliding plate 205. The sliding movement of the plate 205 in one direction is arrested by a stop screw 218 and a stop pin 219, said stop pin being movable with the plate 205, whereas the stop screw 218 is supported in a fixed part of the bed plate 195, see Figs. 10, 11, and 12. A stop pin 220 is fastened to the slidable plate intermediate the shaft 212 and the pin 217 so as to lie in the path of the toggle and limit the movement of the lever 206.

A gage bar 221 is positioned below the clamps O P so as to be movable into a position intermediate said clamps for determining the distance between the adjacent edges of the pieces X X' to be welded. As shown in Fig. 10 this gage bar is provided with a finger 222, and said gage bar is attached to a rod 223 supported in brackets 224 attached to the bed A below the material clamps. When the two pieces of material X X' are to be positioned in the clamps, the gage bar 221 is turned into a raised position for the finger 222 to lie between the inner adjacent ends of the clamps O P, the sliding plate 205 of the clamp being withdrawn by the lever 206, to the position of Fig. 12. The operator now slides the material X' through the clamp O until the edge of said material strikes the finger 221. In a similar manner, the material X is moved within the clamp P for one edge of said material to contact the gage finger 222. The gage bar 221 is now lowered to the position of Fig. 10, thus withdrawing the finger from position between the adjacent edges of the sheet metal pieces X X' in Fig. 12, whereupon the operator swings the lever 206 from the position of Fig 12 into the position of Fig. 11, the effect of which is to straighten the toggle 214, 215 and impart the sliding movement to the member 205 of clamp P, whereby the edge of the material X is brought into lapping relation to the edge of the material X' as in Figs. 10 and 11 so that the lapped edges will occupy a definite relation to the path of the welding rolls F, G.

The electrical connections for supplying current to the motor H and the transformer are illustrated diagrammatically in Fig. 3 of the drawings, which figure shows also certain switches that operate to close the transformer circuit upon the final movement of the sliding table, to retain the transformer circuit in a closed condition during the traverse of the welding rolls into contact with the metal, and to automatically break the transformer circuit at the instant the welding rolls are separated and during the return movement of said welding rolls to normal position.

The feed mains 225, 226 supply current through conductors 227 to the motor H, but of course, a suitable switch may be employed for cutting the current into and out of the motor. From the main 226, a conductor 228 extends to the primary of the transformer C, and from this primary, a conductor 229 extends to a breaker-switch 230 which carries armature 231, a contact 232 and is provided with a locking member 233. The armature of the breaker-switch is adapted to be attracted by a magnet 234 from the coil of which a conductor 235 extends to the main 225, said conductor 235 terminating in a contact 236 with which the contact of the breaker-switch is adapted to make electrical connection when the armature 231 is attracted by said magnet 234. From the coil of magnet 234, a conductor 237 extends to a switch 238 pivoted at 239 and held under the tension of the spring 240. Said switch 238 has a contact 241 adapted for electrical engagement with another contact 242 on a conductor 243 leading from the main 226, said conductor 243 being connected also with the contact 244 adapted to make electrical connection with the contact 245 of another switch 246, the latter being pivoted at 247 and held in a normal position by a spring 248. The switches 238, 246 are provided with spring-pressed plungers 249 which are positioned in the path of yielding trips 250, 251, the said trips being carried on a traveling bar 252 attached by brackets 253, to a side portion of the traveling table A, as shown in Fig. 1. Each trip 250, 251 is pivoted to the bar 252 and is held by a spring 254 into contact with a stop 255, whereby the trips are adapted to travel with the table B, said trips being incased as shown in Fig. 1. To the contact 245 carried by switch 246 is attached a conductor 256 which leads to the coil of a magnet 257, from which coil extends a conductor 258 branched on to the conductor 235. Said magnet 257 attracts an armature 259 on a locking device 260 adapted to coöperate with the locking member 233 of the breaker-switch 230.

When the motor H is energized and the table B moves forwardly, the bar 252 travels with the table and carries the trips 250, 251 with it. The initial movement of the table carries the trip 250 past the plunger 249 of the switch 238, allowing the spring 240 to so act on the switch that the contact 241 makes contact 242 and closes the circuit through the magnet 234 as follows:—From main 225, conductor 235, the magnet coil, conductor 237, contact 241, contact 242 and conductor 243 to main 226. The coil 234 is thus energized, attracting the armature 231 and moving the breaker-switch 230 for the contact 232 to make contact 236 and for the lock 260 to have fixed engagement with a projection 233, thus locking the breaker-switch in a position to retain said contact 232 in electrical engagement with contact 236, whereupon current flows to the transformer from the main 225, conductor 235, contacts 232, 236, switch 230, conductor 229, transformer primary and conductor 228 back to main 226. Current thus flows through the primary during the traverse of the welding rolls into contact with the metal, but when the table reaches the limit of its movement, the trip 251 operates the switch 246 so that current will be supplied to the magnet 257 in a manner to attract the armature 259 and release the lock 260 from the breaker-switch, whereupon the breaker-switch automatically drops to a position for interrupting the circuit to the transformer, whereby the flow of current to the transformer is cut off, prior to the return of the welding rolls and the table to their first position.

The operation of the machine may be summarized as follows:—With the clutch in the neutral position, shown in Fig. 3, the parts of the machine are at rest. The operator raises the gage bar 221 to a position between the clamps O P, and thereafter moves the material X through the clamp B into contact with one edge of the gage finger and shifts the material X' through the clamp O into contact with the other edge of the gage finger, the levers 204 being operated to confine the pieces of material X X' fixedly in the clamps O P. The gage bar is now lowered away from the metal, and the lever 206 is operated to advance the moving parts of the clamp P toward the clamp O, thereby bringing the edges of the metal into lapping relation for a predetermined distance, as shown in Fig. 11. Current having been admitted to the motor H, the operator presses upon the treadle 86, after which the machine is automatic in its action. The lever 89 is operated to move the shipper lever 63 against the tension of the spring 93 and shift the clutch 58 into engagement with the gear 55 so that the shaft J will drive shaft K at relatively slow speed, the latch 85 engaging with the shoulder 98 for locking the shipper lever and the clutch in the position of Fig. 14. The rotation of shaft K imparts movement to nut 66 so as to actuate the bellcrank 72 and lower the head E toward the head D so that the two welding rolls will be pressed together under the yielding pressure of the spring 80, and at this time a table B is moved forwardly by the continued action of the screw-shaft upon the nut, current being supplied through the automatic mechanism to the transformer and thence to the welding rolls, whereby the traversing movement is imparted to the welding rolls. The rolls are positively rotated at a predetermined peripheral speed as they traverse the lapped edges of the metal pieces X X', said rolls exerting pressure and supplying current simultaneously to the metal for the purpose of fusing the metal and pressing the fused metal in a manner to effect a perfect weld. During the forward movement of the table, the bar 113 travels therewith, and by the time the welding rolls traverse the lapped edges of the metal, the plate 110 strikes the bellcrank 106 for the purpose of withdrawing the latch from engagement with the shipper lever, whereupon the spring 93 quickly reverses the shipper lever while the latch is in the retracted position, so that the clutch is moved out of engagement with gear 55 and into engagement with gear 52, whereupon shaft K is driven at faster speed and in an opposite direction from shaft J. The reversal of the screw-shaft pulls on the bellcrank 72 so as to lower the rod 36 and operate the arm 33 for the elevation of the head E, thus separating the rolls, after which the nut 66 acts on the bar 83 to impart reverse movement to the table, the trip 251 acting on the switch 246 to interrupt the circuit to the transformer and arresting the flow of current to the welding rolls prior to the reverse movement of the table and said rolls. As the table approaches the limit of its rearward movement, the plate 112 on the reciprocating bar 113 contacts the shipper lever 63 and moves the clutch into a neutral position, the latch 85 engaging with the shoulder 97 for locking the shipper lever and the clutch in the disengaged position, whereby the parts are returned to and arrested in, their normal positions. The clamps may now be released in order to free the welded metal, and thereafter other pieces of metal are adjusted through or within the clamps so as to place the machine in a condition for subsequent operation substantially in the manner hereinbefore described.

Having thus fully described the invention, what I claim as new, and desire to secure by Letters Patent is:—

1. In a welding machine, the combination with work-retaining means, of coöperating welding rolls, means for feeding an electric current thereto, means for imparting a traversing movement to said rolls, and means for positively rotating said rolls during such traversing movement.

2. In a welding machine, the combination with work-retaining means, of coöperating welding rolls, means for feeding an electric current thereto, means for moving said rolls relatively to each other, means for imparting to said rolls a traversing movement with respect to the work held by said work-retaining means, and means for positively rotating the rolls during such traversing movement.

3. In a welding machine, the combination with a plurality of coöperating welding electrodes at least one of which is a roll movable in a definite path with respect to the material to be operated upon, and means for feeding current to said electrodes, of means for imparting to said welding roll electrode a traversing movement, a plurality of work-retaining devices positioned in operative relation to the path of said welding roll electrode, and means whereby one of said work-retaining devices is movable relatively to the other work-retaining device for a sufficient distance to secure lapping contact between the marginal portions of the material adapted to be held by said work-retaining devices.

4. In a welding machine, the combination with work-retaining means, of a reciprocating carrier movable in a definite path with respect to said work-retaining means, coöperating welding rolls supported on said carrier, means for imparting movement to said carrier whereby a traversing movement is given to the welding rolls, means operable concurrently with the movement of the carrier for reflecting a relative movement between said rolls, and means for feeding electric current to said rolls during the period of said traversing movement.

5. In a welding machine, the combination with work-retaining means, of a carrier movable in a definite path with respect to said work-retaining means, a plurality of welding rolls mounted on said carrier, means for imparting movement to said carrier, means for imparting rotative movement positively to said welding rolls, means operable concurrently with the traversing movement of the carrier for effecting a relative movement between said rolls, and means for feeding electric current to said rolls.

6. In a welding machine, the combination with work-retaining means, of a movable carrier, means for imparting to said carrier a to and fro movement in a definite path with respect to said work-retaining means, coöperating welding rolls supported by the carrier and movable therewith relatively to the work-retaining means, means operated by the movement of the carrier for imparting rotative movement positively to the welding rolls, means operating concurrently with the movement of the carrier for effecting a movement of one roll relatively to the other, whereby the rolls are brought together and separated as the carrier begins and completes its traversing movement, and means for feeding electric current to said rolls.

7. In a welding machine, the combination with work-retaining means, of a carrier movable in a definite path with respect to said work-retaining means, coöperating welding rolls supported by the carrier and movable therewith, means for imparting rotative movement to said welding rolls, means for effecting a variation in the peripheral speed of said welding rolls, and means for feeding electric current to said rolls.

8. In a welding machine, the combination with work-retaining means, of a carrier movable in a definite path with respect to said work-retaining means, coöperating welding rolls supported by the carrier and movable therewith, means for imparting rotative movement to said welding rolls, means controllable at will for effecting a variation in the speed of said rolls, and means for feeding electric current to said rolls.

9. In a welding machine, the combination with work-retaining means, of a carrier reciprocable in a definite path with respect to said work-retaining means, coöperating welding rolls supported by said carrier and movable therewith, means for feeding electric current to said carrier, and a reversible driving mechanism for imparting movement to said carrier.

10. In a welding machine, the combination with work-retaining means, of a carrier reciprocable in a definite path with respect to said work-retaining means, coöperating welding rolls supported by said carrier and movable therewith, means for feeding electric current to said carrier, driving mechanism for imparting movement to said carrier, and means for reversing said driving mechanism, said means being controllable by the travel of said carrier.

11. In a welding machine, the combination with work-retaining means, of a carrier reciprocable in a definite path with respect to said work-retaining means, coöperating welding rolls supported by said carrier and movable therewith, means for feeding electric current to said carrier, a train of driving gears, means operated by said gears for imparting movement to said carrier, means operable at will for starting the gears, and means controllable by the to and fro movement of the carrier for reversing said gears and for arresting the movement of said carrier.

12. In a welding machine, the combination with work-retaining means, of a carrier reciprocable in a definite path with respect to said work-retaining means, coöperating welding rolls supported by said carrier and movable therewith, means for feeding electric current to said carrier, a reversible train of gears, a screw shaft and nut operated by said shaft for imparting a to and fro movement to said carrier, a shipper lever, means controllable by the travel of the carrier in one direction for reversing the shipper lever, and other means controllable by the movement of the carrier in an opposite direction for moving the shipper lever to a neutral position with respect to the gear train.

13. In a welding machine, the combination with a reciprocable carrier and coöperating welding devices movable therewith, of a reversible driving means including a shipper lever, means for operating the shipper lever to start the gear train into action for effecting the movement of the carrier in one direction, means controllable by the travel of the carrier for moving the shipper lever to reverse the driving means, and separate means also controllable by the travel of the carrier for moving the shipper lever to a neutral position and effecting the stoppage of the carrier.

14. In a welding machine, the combination with a movable carrier and welding devices carried thereon, of a coöperating screw and nut for effecting a to and fro movement of the carrier, and reversible driving means for imparting rotative movement to said screw.

15. In a welding machine, the combination with a carrier, and welding rolls movable therewith, of means for imparting reciprocating movement to said carrier, and roll driving means operable by the movement of said carrier.

16. In a welding machine, the combination with a carrier, a rack positioned adjacent the path of said carrier, a gear supported by the carrier and meshing with the rack whereby rotative movement is imparted to the gear, and means operated by the gear for imparting rotative movement to said welding rolls simultaneously with the movement of the carrier.

17. In a welding machine, the combination with a carrier, of a plurality of separate roll mounts supported on said carrier, one of said roll mounts being movable relatively to the other roll mount, welding rolls rotatably supported in the roll mounts, a rack separate from the carrier, a gear supported on the carrier for movement therewith, said gear meshing with the rack, and separate gear trains supported on the mounts, said gear trains being driven by the rotative movement of the first named gear and operating to positively rotate the welding rolls simultaneously with the traversing movement of the carrier.

18. In a welding machine, the combination with a carrier, of a plurality of separate roll mounts supported on said carrier, one of said roll mounts being movable relatively to the other roll mount, welding rolls rotatably supported in the roll mounts, a rack separate from the carrier, a plurality of cross shafts supported on the carrier for movement therewith, one of said cross shafts being provided with a gear in mesh with said rack, separate gear trains mounted on said roll mounts for imparting rotative movement to said welding rolls, and means including universal joints positioned intermediate the cross shafts and said gear trains.

19. In a welding machine, the combination with a reciprocable carrier, and welding rolls movable therewith, of a rack positioned adjacent the carrier, means coöperating with the rack for rotating said rolls, and means for imparting movement to said rack concurrently with the movement of the carrier so as to accelerate the speed of rotation of said welding rolls.

20. In a welding machine, the combination with a reciprocable carrier, and welding rolls movable therewith, of means operable by the travel of the carrier for effecting rotative movement of the rolls at a predetermined speed, and means separate from the carrier for effecting a variation in the peripheral speed of said rolls.

21. In a welding machine, the combination with a reciprocable carrier, and welding rolls movable therewith, of means operable by the travel of the carrier for effecting rotative movement of the rolls at a predetermined speed, and means coöperating with the roll-driving means and independent of the carrier for accelerating the peripheral speed of said welding rolls.

22. In a welding machine, the combination with a reciprocable carrier, and welding rolls movable therewith, of means operable by the travel of the carrier for effecting rotative movement of the rolls at a predetermined speed, and means dependent upon the movement of the carrier and controllable at will for changing the speed of rotation of the welding rolls.

23. In a welding machine, the combination with a reciprocable carrier, and welding rolls movable therewith, of roll-driving means including a rack for imparting rotative movement at a predetermined speed to said rolls and means for moving the rack in an opposite direction to the travel of the carrier and simultaneously therewith whereby the speed of rotation of the welding rolls is accelerated.

24. In a welding machine, the combination with a reciprocable carrier, and welding rolls movable therewith, of roll-driving means including a rack for imparting rotative movement at a predetermined speed to said rolls, and means for moving the rack in an opposite direction to the travel of the carrier and simultaneously therewith whereby the speed of rotation of the welding rolls is accelerated, said rack moving mechanism being dependent for its operation upon the movement of the carrier.

25. In a welding machine, the combination with a reciprocable carrier, and welding rolls movable therewith, of roll-driving means including a rack for imparting rotative movement at a predetermined speed to said rolls, a shaft geared to the rack for shifting the latter simultaneously with the movement of the carrier, a transverse rack geared to said shaft, and a shiftable speed controlling member movable with the carrier and coöperating with said transverse rack for imparting movement to said rack.

26. In a welding machine, the combination with a reciprocable carrier, and welding rolls movable therewith, of roll-driving means including a rack for imparting rotative movement at a predetermined speed to said rolls, a shaft geared to said rack, a transverse rack geared to said shaft, a speed controlling member, means connecting said member with the carrier for movement therewith, means whereby said member may be shifted to different angular positions relatively to the path of said carrier, and means coöperating with said member and the transverse rack whereby the movement of the carrier operates the transverse rack and the first named rack to effect a variation in the speed of rotation of said welding rolls.

27. In a welding machine, the combination with a reciprocable carrier, and welding rolls movable therewith, of roll-driving means including a rack for imparting rotative movement at a predetermined speed to said rolls, a graduated bar inclined relatively to the path of said carrier and movable therewith, a speed-controlling member having pivotal connection with said carrier, means connecting said member with the graduated bar whereby said member may be shifted to different inclined positions with respect to the path of the carrier, and means coöperating with said speed controlling member for imparting movement to said rack in a manner to effect a variation in the speed of rotation of said rolls.

28. In a welding machine, the combination with a reciprocable carrier, and welding rolls movable therewith, of roll-driving means including a rack for imparting rotative movement at a predetermined speed to said rolls, a graduated bar inclined relatively to the path of said carrier and movable therewith, a speed-controlling member having pivotal connection with said carrier, means connecting said member with the graduated bar whereby said member may be shifted to different inclined positions with respect to the path of the carrier, a transverse rack, gearing between the first named rack and the transverse rack, and a pivotal connection between the transverse rack and the speed controlling member whereby the inclination of the latter member determines the speed of movement of the first named rack so as to effect a variation in the speed of rotation of the welding rolls.

29. In a welding machine, the combination with a movable carrier, of coöperating welding rolls one of which is mounted for pivotal movement, of means for imparting a to and fro movement to said carrier, and means operating concurrently with the reciprocating movement of the carrier for effecting a pivotal movement of one welding roll relatively to the roll coöperating therewith.

30. In an electric welding machine, the combination with a reciprocable carrier, and coöperating welding rolls thereon, one of said rolls being mounted for pivotal movement, of a feed screw, means for imparting rotative movement thereto, a feed nut connected with the carrier and coöperating with said feed screw, and means controllable by the movement of said nut for imparting movement to said pivotal welding roll.

31. In an electric welding machine, the combination with a reciprocable carrier, and coöperating welding rolls thereon, one of said rolls being mounted for pivotal movement, of a feed screw, means for imparting rotative movement thereto, a feed nut coöperating with said screw, said feed nut being connected with said carrier to secure a limited lost motion relatively thereto, and means for imparting movement to the pivotal welding roll, said roll operating means being actuated by the lost motion of said feed nut.

32. In an electric welding machine, the combination with a reciprocable carrier, and coöperating welding rolls thereon, one of said rolls being mounted for pivotal movement, of means for imparting a to and fro movement to said carrier, means operable concurrently with said movement of the carrier for imparting pivotal movement to one of said rolls whereby the coöperating rolls may be closed upon or separated from the material to be welded, and spring mechanism for yieldably retaining said rolls into contact with the material during the welding operation.

33. In an electric welding machine, the combination with a reciprocating carrier, and welding rolls movable relatively to each other for bringing them together and separating the same, of means including a screw and nut for imparting movement to the carrier, a spring actuated member connected for effecting the relative movement between said rolls, and means operable by said nut for imparting movement to said spring actuated member.

34. In an electric welding machine, the combination with a reciprocating carrier, of a roll-mount rigid with said carrier, a second roll-mount pivoted to the carrier, said second roll-mount having an arm, rolls journaled in said roll-mounts, means including a screw and nut for imparting movement to the carrier, a spring-actuated member connected to the arm of the pivoted roll-mount, and an operating member intermediate the nut and the spring-actuated member.

35. In an electric welding machine, the combination with work-retaining means, a reciprocating carrier, and welding rolls supported thereby, of a feed screw and nut for imparting movement to said carrier, a reversible driving gear for rotating the feed screw, a shipper member coöperating with members of said driving gear, means for locking the shipper member in a neutral position, and means controllable by the travel of the carrier for actuating the shipper member.

36. In an electric welding machine, the combination with work-retaining means, a reciprocating carrier, and welding rolls supported thereby, of a feed screw and nut for imparting movement to said carrier, a reversible driving gear for rotating the feed screw, a shipper member coöperating with members of said driving gear, a reciprocating bar movable with said carrier, and operating devices supported by said bar, said shipper member being positioned in the path of said operating devices.

37. In an electric welding machine, the combination with a reciprocating carrier, and welding devices supported thereon, of a feed screw for imparting movement to said carrier, a reversible driving gear coöperating with said screw, a shipper lever operatively related to members of said driving gear, means operated by the carrier for actuating the shipper lever, manually controlled means for moving the shipper lever, and a locking member coöperating with the shipper member, said locking member being yieldable to the movement of said shipper lever.

38. In an electric welding machine, an electrode-carrying head provided with a slot and with circulating passages, said passages being positioned interiorly of the head and extending around the slot therein, in combination with a roller electrode positioned partially within said slot, said roller electrode being composed of a solid mass of current carrying metal, and means for feeding a cooling medium to said circulating passages.

39. In an electric welding machine, a plurality of electrode supporting heads each provided interiorly thereof with circulating passages, electrodes carried by said heads, each electrode being composed of a solid mass of current carrying metal, means connecting the circulating passages of one head with the similar passages of the other head, and means for feeding a cooling medium to one head and conducting said medium from the other head.

40. In an electric welding machine, the combination of roll-supporting heads provided with circulating passages, bearing boxes attached to said heads, said bearing boxes being provided with circulating passages, means connecting the passages of the heads and the bearing boxes, current-carrying rolls mounted on the heads and boxes, and circulating means whereby a cooling medium is adapted to flow interiorly of the heads and the boxes.

41. In an electric welding machine, the combination of roll-supporting heads, each provided with a slot and with interior passages looped relatively to the slot, rolls positioned within the slots of said heads and journaled therein, and means for establishing the circulation of a cooling medium through the passages of said heads.

42. In an electric welding machine, the combination with a plurality of welding electrodes, means for feeding electric current thereto, and means for imparting reciprocating movement to at least one of said electrodes, of a plurality of work retaining devices positioned at the respective sides of the path of movement of said reciprocating electrode, and means operable at will for shifting one of said work retaining devices relatively to the path of said reciprocating electrode whereby the material held by the work retaining devices is adapted to be positioned in lapping contact.

43. In an electric welding machine, the combination with a reciprocating carrier, and current-carrying rolls supported thereby, of means for feeding electric current to said rolls, switch mechanism in circuit with the current feeding means, means for locking said switch mechanism upon the establishment of the flow of current to the rolls, and means for interrupting the flow of current to the rolls, said interrupting means and the switch locking means being controllable by the movement of said carrier.

44. In an electric welding machine, the combination with a reciprocating carrier, and current-carrying rolls supported thereby, of a circuit for feeding electric current to said rolls, switch mechanism and contact devices included in said circuit, means for locking the switch mechanism, and means operated by the movement of the carrier for opening and closing said circuit so as to establish the flow of current as the carrier begins its movement and to cut off the flow of current prior to the return movement of said carrier.

45. In an electric welding machine, the combination with a carrier, current-carrying rolls thereon, and means for actuating the carrier, of means for feeding electric current to said rolls, and means dependent for its control upon the movement of the carrier for bringing the current feeding means into operation as the carrier begins its movement and to cut off the flow of current prior to the return movement of said carrier.

46. In an electric welding machine, the combination of a plurality of work-retaining devices, means for imparting movement to one of said devices relatively to the other, means for arresting the movement of said movable device, and welding means movable in a path across the metal held by said work-retaining devices.

47. In an electric welding machine, the combination of a stationary clamp, a movable clamp, means operable at will for imparting movement to said latter clamp for a definite distance relatively to the stationary clamp, whereby the metal in the movable clamp is positioned in lapping relation to the metal in the stationary clamp, and welding devices movable in a path across the lapped metal in said clamps.

48. In an electric welding machine, the combination of a stationary work holder having a cam-actuated clamping member, a movable work holder provided with a cam-actuated clamping member, means operable at will for shifting the movable work holder relatively to the stationary work holder, and welding devices movable in the direction of the lapped metal held in said work holders.

49. In an electric welding machine, the combination with a plurality of work holders movable relatively to each other, and material-positioning means adapted to limit the introduction of metal into each of said work holders.

50. In an electric welding machine, the combination with a plurality of work holders movable relatively to each other, positioning means movable between the work holders and into the path of metal adapted to be introduced therein, and means operable upon the displacement of said positioning means for moving one work holder for a definite distance with respect to the other work holder.

51. In an electric welding machine, the combination with welding devices, of a plurality of work holders positioned at the respective sides of said welding devices, each work holder having means for retaining the work to be operated upon, and means operable at will for shifting one work holder relatively to the other whereby the material may be positioned in contact prior to welding by said welding devices.

52. In an electric welding machine, the combination with a plurality of work holders, of work-positioning means in operative relation to said work holders and operative in limiting the movement of material therein.

In testimony whereof, I have hereunto signed my name.

GUSTAVE H. SCHKOMMODAU.

Witnesses:
    NAT MACMAH,
    A. J. GALLAGHER.

Copies of this patent may be obtained for five cents each, by addressing the "Commissioner of Patents, Washington, D. C."